H. Rees,
Revolving Rake.
No. 89,343.  Patented April. 27, 1869.
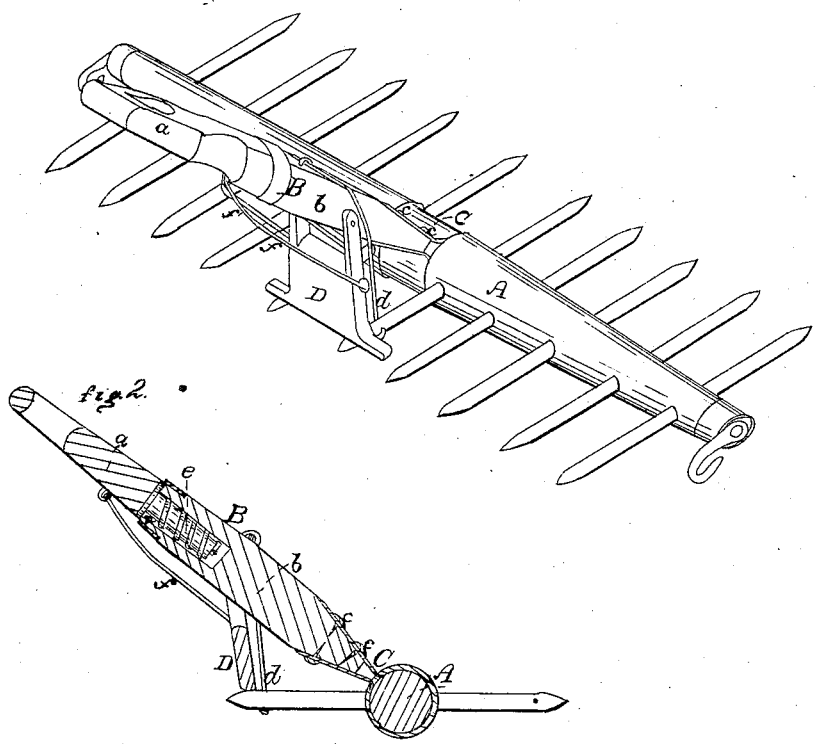
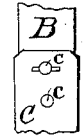
Witnesses.  Inventor.

UNITED STATES PATENT OFFICE.

HENRY REES, OF PETERSBURG, INDIANA.

IMPROVEMENT IN HORSE-RAKES.

Specification forming part of Letters Patent No. 89,343, dated April 27, 1869.

*To all whom it may concern:*

Be it known that I, HENRY REES, of Petersburg, in the county of Pike, and in the State of Indiana, have invented certain new and useful Improvements in Hay-Rakes; and do hereby declare that the following is a full, clear, and exact description thereof, reference being had to the accompanying drawings, and to the letters of reference marked thereon.

The nature of my invention consists in the construction and arrangement of a hay-rake, which will be hereinafter fully set forth.

In order to enable others skilled in the art to which my invention appertains to make and use the same, I will now proceed to describe its construction and operation, referring to the annexed drawings, which form a part of this specification, and in which—

Figure 1 is a perspective view; Fig. 2, a side view in section; and Fig. 3, a plan view, showing the joint between the rake and the handle.

A represents the rake, and B the handle. The latter is made of two parts, one of which, $a$, works into the other, $b$. It is attached to the rake A by a metallic band, C, which passes around the rake at its center, and is attached to the handle by two rivets or bolts, $c\ c$.

The plate or band C is slotted at the upper bolt, so that the handle can be shifted from right to left, so that the hooks $d\ d$, which extend below the handle and are to hold the rake, can be made, by the operator, to pass under the fingers of the rake.

The part $a$ of the handle, which works inside the stock $b$, works also inside a wire spring, $e$, one end of which is attached to the lower end of the part $a$, the other to a rivet near the place where it enters the stock $b$.

To the stock $b$ is pivoted a stop, D, under which the two center fingers on the rake catch, thus preventing the rake from revolving. This stop D is connected with the handle proper, $a$, by means of two rods, $f\ f$. By pulling the handle proper, $a$, out it draws, by means of the wires or rods $f\ f$, the stop D from over the fingers of the rake and permits it to revolve. The wire spring $e$ then draws the part $a$ back to its place, and the operator, by shifting the handle either to the right or left, passes the hooks $d\ d$ under the fingers of the rake.

Having thus fully described my invention, what I claim as new, and desire to secure by Letters Patent, is—

1. The handle B, constructed, as described, in two parts, $a$ and $b$, the handle proper, $a$, working inside the stock $b$, and also inside a wire spring, $e$, substantially as shown and described.

2. In combination with the handle B, constructed as above described, the stop D, rods $f\ f$, and hooks $d\ d$, all substantially as and for the purposes herein set forth.

3. The combination of the rake A, handle B, and slotted band C, all constructed and operating substantially as and for the purposes herein set forth.

In testimony that I claim the foregoing I have hereunto set my hand this 2d day of December, 1868.

HENRY REES.

Witnesses:
S. T. PALMER,
H. M. SCOTT.